Dec. 20, 1927.
K. HERMAN
1,653,176
WINDSHIELD CLEANER AND DRIER
Filed Nov. 24, 1926
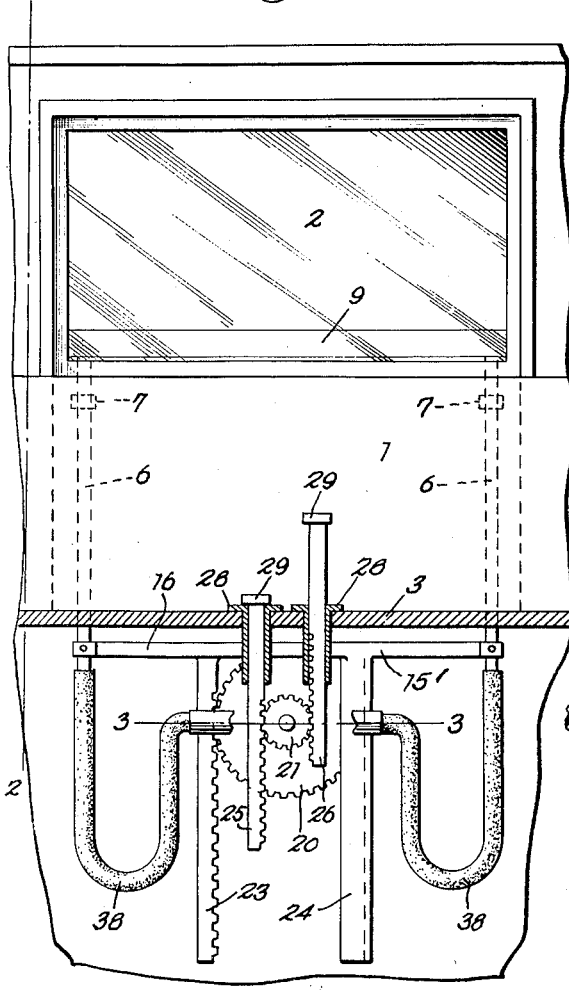
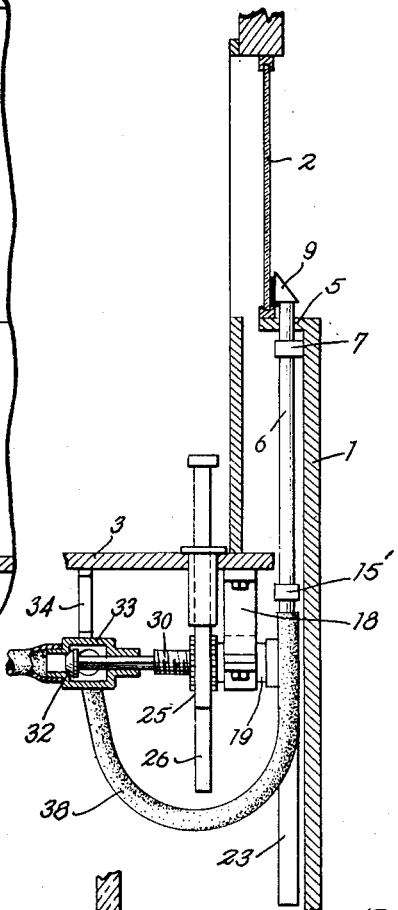
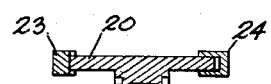
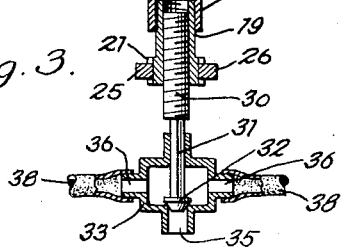
Inventor
Karl Herman
By Ernest E. Weaver
Attorney Patented Dec. 20, 1927.

1,653,176

UNITED STATES PATENT OFFICE.

KARL HERMAN, OF CHESTER, PENNSYLVANIA.

WINDSHIELD CLEANER AND DRIER.

Application filed November 24, 1926. Serial No. 150,611.

This invention relates to cleaning devices for windshields of automobiles, street car, locomotive or pilot house windows, or in fact any window upon which collects frost, snow, moisture or the like.

One of the objects of the invention is the provision of a manually operated reciprocatory scraping and blowing device, in the nature of a nozzle, which is adapted to be moved over a glass window pane, and upon motion in one direction scrape and simultaneously blow away the snow, ice or frost which has been removed by the scraper, and upon motion in the other direction, rub off the moisture which has not been removed by the blower.

A further object is the provision of a cleaning device which is combined with a valve, in such manner that, as the scraper and blower is operated, said valve will automatically operate to control the admission of air to said blower.

It is to be understood that, while I have shown the device as being movable over the window pane, it may be maintained stationary, and used only as a blower in the manner hereinafter described.

In the drawings,

Fig. 1 is a front view of the invention,

Fig. 2 is a vertical sectional view on the line 2—2 of Fig. 1,

Fig. 3 is a horizontal sectional view on the line 3—3 of Fig. 1,

Fig. 4 is a vertical sectional view on the line 4—4 of Fig. 5, and

Fig. 5 is a rear elevation of one end of the combined scraper and blower nozzle.

Referring now more particularly to the drawings by numerals of reference, 1 designates the front frame portion of the vehicle, and 2 the window thereof, said window being suitably mounted in any conventional framing. The floor is shown at 3, and supports the principal operating mechanism in the manner to be described.

Extending upwardly through openings in the sill portion 5 of the front frame, and adjacent the opposite ends of the window 2, are a pair of vertical air pipes 6, vertically slidable in guides 7.

Supported at the upper extremity of the pipes 6, is a horizontal blower nozzle 9, preferably of a form triangular in cross section, the walls of which enclose an air space 10, in communication with the pipes 6.

The blower nozzle is adapted to lie in contact with the window pane, and is provided upon its rear vertical wall 11, with a scraper knife 12, which, as the device is moved over the surface of the pane, effectually removes the snow, ice or sleet which has accumulated thereon. Immediately in advance of, or above the scraper, the rear wall 11 of the blower is provided with a series of suitably sized, upwardly and rearwardly directed openings 14, drilled through said wall at an angle of approximately 45 degrees to the plane of the window glass, so that, as the scraper knife moving upwardly, scrapes off the ice or snow, the air passing under pressure from the blower nozzle through the openings 14, will blow the scrapings away.

The blower nozzle is further provided with a rubber strip 15, extending longitudinally of and secured to the rear wall 11, so that, as the device moves downwardly on its return stroke, any moisture on the window pane will be rubbed or wiped off.

The combined blower, nozzle, scraper and rubber is moved upwardly and downwardly through the medium of a rigid reciprocating frame 15', to the upper horizontal bar 16 of which the lower ends of the air pipes 6 are secured, and preferably by passing through openings in the ends thereof, although any convenient manner of attachment may be employed.

Journalled in a bracket 18, mounted beneath the floor 3, is a shaft 19, having on one end a large spur gear 20, and on the opposite end, a relatively smaller spur gear 21, said shaft being formed in two sections, and capable of being coupled for unitary movement or uncoupled for independent movement of the gear 21 through the medium of a clutch sleeve 22.

The forward or larger gear 20 is in mesh with a vertical rack bar 23, depending from, and rigid with the cross bar 16 of the reciprocating frame, the said gear at its diametrically opposite point, being guided during its rotation by a grooved guide bar 24, parallel with said rack bar 23, and also depending from and rigid with the horizontal cross bar 16.

The rear or smaller spur gear 21 is in mesh at diametrically opposite points with a pair of parallel sliding rack bars 25 and 26 respectively, said rack bars being slidable through guides 28 set into the floor 3, and said rack bars being further provided at their upper ends with foot treadles 29. As shown in Fig. 1, the racks are arranged in such manner, that when one is depressed, the other simultaneously moves upwardly, or vice versa.

The rear portion of the shaft, carrying the small gear 21 is internally threaded and receives the threaded portion 30 of a valve stem 31, operating a valve 32 within a valve body 33, the latter being supported from the under face of the floor 3 by a bracket 34. The valve body 33 is provided with an inlet 35 and a pair of opposed outlets 36. Air under pressure from any suitable source is conveyed to the valve body, and from thence distributed to the opposite ends of the blower nozzle 9, by means of flexible hose 38, connected at their ends respectively with the outlets 36 and the lower ends of the air pipes 6.

*Operation.*

Assuming the several parts of the apparatus are in the position shown in Figs. 1 and 2, in which the nozzle 9 is at the lower edge of the glass window pane, the operator of the vehicle depresses the rack bar 26 by pressing with his foot on the treadle 29. Downward movement of said rack bar, through the small gear 21 causes rotation of shaft 19, and the reciprocation of valve stem 31, through its threaded engagement with shaft 19, thereby unseating the valve 32 and admitting air under pressure into the flexible hose 38, pipes 6 and nozzle 9, from which it is distributed through the air jet openings 14 onto the glass.

Simultaneously with the opening of the valve 32, the large gear 20, coupled with shaft 19 by clutch sleeve 22, rotates and through its geared relation with rack bar 23 of the frame 16, elevates the latter and moves the scraper and blower over the window pane, removing any accumulation of ice, snow or frost in the manner which has been previously described.

The blower nozzle and scraper having now been moved to its upper-most position over the window, the operator depresses the other rack bar 25 which has been elevated during depression of rack bar 26. Depression of said rack 25, through the gearing described, results in the lowering of the blower nozzle and scraper, and a simultaneous closing of the valve 32, the rubber strip 15 on the rear wall of the nozzle wiping or rubbing off the moisture on said downward movement thereof.

When it is desired to use the blower without reciprocating it, the clutch sleeve 22 is moved to disengage shaft 19 from the large gear 20, and when this is done the valve 32 may be opened and closed by the operation of the rack bars 25 and 26 in alternation, without resulting in the movement of the frame 16 and the blower nozzle.

It is understood that many changes in design and detail may be resorted to when necessary and I therefore reserve unto myself all rights to make necessary improvements, alterations or changes in my invention.

What I claim as my invention is:—

1. An apparatus for removing ice, snow, frost and moisture from a window glass of a vehicle, comprising a reciprocatory nozzle adapted to be mounted adjacent a window glass, means for reciprocating said nozzle over the surface of said glass, a valve, means of communication between said valve and said nozzle, and means for simultaneously operating said valve and reciprocating said nozzle.

2. An apparatus for removing ice, snow, and moisture from a window glass, comprising a nozzle adapted to be mounted adjacent the window glass, and movable over the surface thereof, said nozzle having upwardly and rearwardly directed air jet openings in the rear wall thereof, and arranged at an angle to the plane of the glass, a valve connected with a source of fluid pressure, means of communication between the said nozzle and said valve, and means for operating said valve and simultaneously recprocating said nozzle.

3. A window glass cleaner comprising, a reciprocatory air nozzle mounted adjacent a window, a knife scraper, on the rear wall thereof, adapted to lie in contact with the window glass, a longitudinal series of air jet openings extending along said nozzle in the rear wall thereof, and in advance of said knife scraper, and a rubber strip on said wall below said scraper, an air valve in communication with said nozzle, and means for simultaneously operating said valve and reciprocating said nozzle.

4. A window glass cleaner comprising, an air nozzle adapted to be moved over the surface of said pane, a knife scraper mounted on the rear face of said nozzle, a frame for supporting said nozzle, an air valve connected with a source of fluid pressure, means of communication between said nozzle and said valve, gearing carried by said nozzle supporting frame for raising and lowering the latter, gearing carried by said valve, and means for operating said valve gearing and simultaneously operating said frame gearing, whereby said valve may be opened and closed simultaneously with the raising and lowering of said air nozzle.

5. A window glass cleaner comprising, an air nozzle adapted to be moved over the surface of said pane, a knife scraper mounted on the rear face of said nozzle, a frame for supporting said nozzle, an air valve connected with a source of fluid pressure, means of communication between said nozzle and said valve, gearing carried by said nozzle supporting frame for raising and lowering the latter, gearing carried by said valve, and means for operating said valve gearing and simultaneously operating said frame gearing, whereby said valve may be opened and closed simultaneously with the raising and lowering of said air nozzle, and a clutching and unclutching means intermediate said frame gearing and said valve gearing, whereby said valve may be operated independently of said nozzle frame operating device.

In testimony whereof I affix my signature.

KARL HERMAN.